United States Patent [19]

Miles et al.

[11] Patent Number: 4,699,730

[45] Date of Patent: Oct. 13, 1987

[54] MAGNESIUM SULFATE AND COMPLEX SILICATE MINERAL PAINT DENATURANT

[75] Inventors: Donald L. Miles, Farmington Hills; Harry R. Charles, Sterling Heights, both of Mich.

[73] Assignee: Chemfil Corporation, Troy, Mich.

[21] Appl. No.: 738,154

[22] Filed: May 24, 1985

[51] Int. Cl.$^4$ ............... B01D 47/00; B08B 3/08; C09D 9/00; C23D 17/00

[52] U.S. Cl. ............... 252/181; 55/85; 98/115.2; 106/2; 134/38; 252/175; 252/DIG. 8; 427/331; 427/345

[58] Field of Search ............... 252/180, 181, 175; 210/723, 728, 733; 98/115.2; 55/85; 106/2; 134/38; 427/331, 345

[56] References Cited

U.S. PATENT DOCUMENTS

| | | | |
|---|---|---|---|
| 2,982,723 | 5/1961 | Arnold et al. | 55/84 |
| 3,346,873 | 10/1967 | Herrmann | 252/527 |
| 3,515,575 | 6/1970 | Arnold | 55/84 |
| 3,979,191 | 9/1976 | Furuta et al. | 55/68 |
| 4,055,404 | 10/1977 | Daimer | 55/85 |
| 4,067,806 | 1/1978 | Mauceri | 252/181 |
| 4,071,449 | 1/1978 | Inoue | 210/53 |
| 4,125,476 | 10/1978 | Dean | 252/115 |
| 4,130,674 | 12/1978 | Roberts et al. | 427/331 |
| 4,185,970 | 1/1980 | Dean | 55/89 |
| 4,220,456 | 9/1980 | Block | 55/85 |
| 4,265,944 | 5/1981 | Garner | 427/353 |
| 4,294,617 | 10/1981 | Schlicklin | 106/14.37 |
| 4,339,248 | 6/1982 | Garner | 55/89 |
| 4,425,238 | 1/1984 | Degen | 210/666 |
| 4,440,647 | 4/1984 | Purchalski | 210/712 |
| 4,496,374 | 1/1985 | Murphy | 55/84 |
| 4,504,395 | 3/1985 | Harpel | 210/712 |
| 4,510,066 | 4/1985 | Saar | 252/140 |
| 4,524,012 | 6/1985 | Wixon | 252/174 |

OTHER PUBLICATIONS

Latimer, W. M. et al., Reference Book of Inorganic Chemistry, Third Edition, The Macmillan Company, New York, 1951, pp. 577 & 587.

Val Olphen, H., An Introduction to Clay Collaid Chemistry, 2nd Ed., pp. 111–120, 162–199.

Primary Examiner—Dennis L. Albrecht
Attorney, Agent, or Firm—Godfried R. Akorli

[57] ABSTRACT

The paint denaturant composition of this invention includes mixing magnesium sulfate with complex silicate minerals. The complex silicate minerals disclosed include bentonite clay, kaolin clay, and diatomite preferably a mixture thereof. The paint denaturant composition as disclosed is preferably a slurry but may be a dry powder composition. Additives incorporating magnesium sulfate, or a combination of magnesium sulfate, a polyelectrolyte and water, are also disclosed for use with paint denaturant compositions including silicate minerals. The addition of a polyelectrolyte solution to the magnesium sulfate and complex silicate mineral paint denaturant composition is also disclosed for improving floculation prior to filtration or mechanical separation.

5 Claims, No Drawings

MAGNESIUM SULFATE AND COMPLEX SILICATE MINERAL PAINT DENATURANT

BACKGROUND OF THE INVENTION

I. Field of the Invention

This invention relates generally to water soluble compositions having complex silicates and magnesium sulfate used primarily for water treatment systems. More specifically, this invention relates to compositions and methods used in water treatment systems of paint spray booths.

II. Description of the Background Art

Modern industrial paint spraying is performed in special paint spray booths. The booths generally are enclosed and have a circulating water system which is used to scrub paint overspray particles from the air. Some paint spray booths have a water washed floor and devices for mixing water and air to promote the removal of paint overspray particles from the air by the water. Complex silicate minerals, such as diatomite, and other inert materials are known to be used in paint spray booths water recirculating systems to improve the paint "killing" abilities of such systems. Paint killing as used herein refers to detackifying the paint particles, or eliminating their adhesive properties.

Generally it is preferable to provide a concentrated slurry form product for ease in handling, transportation and elimination of dust. Slurry form material is easier to handle because it may be added to water by merely pumping the material into the water recirculating system. Transportation of slurry materials is preferred because it can be shipped by tank truck in bulk or drum form. One of the most important features of providing complex silicate material based paint denaturant in slurry form is that it eliminates the problems associated with using fine particulate materials in paint spray booths.

Bentonite clay is commonly used for this purpose due to its favorable properties in absorbing or adsorbing live paint. However, bentonite's tendency to swell when mixed with water makes it inappropriate for use as a slurried material. Bentonite can only be slurried to less than 5% solids concentration in water before it becomes a semi-plastic material which is not pumpable. Heretofore, it has not been economically feasible to provide paint denaturants including bentonite in a slurry form because the low solids content require excessive amounts of concentrate be added to the water recirculating system. The low levels of solids achievable would also necessitate excessive handling and transportation costs to use bentonite in slurry form. Bentonite is particularly effective in absorbing polar components of paints such as alcohol and other molecules with hydroxyl groups such as acrylic polymers.

Kaolinite is known to be used in some paint denaturant compositions but it does not have favorable absorptive properties. Kaolinite does not swell in water as does bentonite and it is more stable in aqueous solutions than bentonite. Kaolinite is used in paint denaturant compositions to separate other inert materials such as bentonite or talc thereby achieving better dispersion of the inert materials. Kaolinite is effective in absorbing some partially polar components such as ketones to a limited extent. However, it's lack of good paint killing or paint absorption properties generally makes kaolin an inappropriate material for a paint denaturant.

Talc is known generally as a good oil and solvent absorbing material, However, talc particles are relatively large, about 10 microns in size, and tend to settle out of a slurry mixture forming a non-homogeneous dispersion. It has been found that mixing kaolin clay with talc aids in forming a suspension due to the thixotropic properties of the kaolinite. Talc tends to be best at absorbing non-polar materials such as aromatic solvents and is useful in some paint denaturing compositions.

Diatomite, or kieselguhr, is another complex silicate mineral which is an effective absorptive material useful for encapsulating paint particles. However, diatomite is a non-swelling mineral which requires a thixotropic material such as kaolinite to permit it to become suspended as a slurry. Diatomite is particularly effective at adsorbing and absorbing non-polar type materials such as oily substances including toluene and melamine.

Other inert materials such as mica and trilite clay are ocassionally used in paint denaturing compositions but are objectionable due to their fiberous nature and their classification as hazardous materials when used in dry form because they are in the family of asbestiform materials.

Combinations of the above materials including especially bentonite have been experimented with however the viscosity of bentonite in solution is a limiting factor to using such combinations as slurries. Once several of the above materials are combined and include bentonite the percent of solids in a liquid concentrate, or slurry, must be maintained below about 7% by weight or the composition becomes plastic, and difficult to pump.

The most important factor in evaluating paint denaturant performance is the degree to which it detackifies the paint overspray, or "kills" the paint. A properly killed paint will not adhere to the paint spray booth surfaces or the water recirculating equipment. A problem with prior paint denaturants is the residual tackiness of the killed paint overspray residue. The residue of some paints may over time redevelop tackiness. The residue of some paints may also become tacky if exposed to solvents used to clean or purge the paint spraying equipment.

A nonsilicate paint denaturant comprising an aqueous solution of iron sulfate, magnesium sulfate or manganese sulfate either with or without a surfactant is disclosed in U.S. Pat. No. 4,294,617 to Schlicklin, et. al., which is limited to denaturing water-base paints. The compositions disclosed in the Schlicklin patent is not intended to be used with solvent based paints and does not suggest the combination of such compounds with complex silicate minerals.

SUMMARY OF THE INVENTION

A paint denaturant composition according to one aspect of the present invention advantageously contains magnesium sulfate ($MgSO_4$) in a collodial suspension with one or preferably two or more complex silicate minerals. The complex silicate minerals may comprise one or more of the following compositions including bentonite, kaolinite, or diatomite.

It has been discovered that an aqueous solution of magnesium sulfate can be used as an additive to known silicate based paint denaturants to improve efficiency. The magnesium sulfate is believed to have a peptizing effect which increase dispersion of the colloidal solution.

It is also been discovered that an aqueous solution of magnesium sulfate and a cationic polyelectrolyte can be used as an additive to known silicate based paint denaturants to control flocculation and improve efficiency. The magnesium sulfate and polyelectrolyte composition is believed to have a peptizing effect which increases the dispersion of the colloidal solution as well as increasing flocculation.

While it is not known how the magnesium sulfate functions in the compositions of the invention, it is postulated that the magnesium sulfate when placed in a solution including complex silicate minerals, such as bentonite, the magnesium ion of the magnesium sulfate undergoes an ion exchange with sodium counter ions between the bentonite layers. The magnesium ion may also undergo ion exchange with other impurities found between the layers of clay. The magnesium ions have unique properties in the paint denaturants of this invention in that they have a very small molecular size of less than 10 angstroms, allowing the penetration of the interlayer spacing of layered silicate minerals such as bentonite and kaolinite. The magnesium ion expands the interlayer spacing to more than ten angstroms which is equivalent to the nominal size of the polymer helix. In particular, polymer based paints have helical carbon chain structures having a nominal helix diameter of ten angstroms.

The ion bonding of the magnesium ion between the layers of the clay particals enlarges the interlayer spacing and enables the polymer helix to penetrate the interlayer space. When the paint particles come in contact with the magnesium ions the paint emulsion is destablized by the magnesium ion. As the paint is destablized, the smaller solvent and pigment molecules are absorbed into the silicate mineral surface exposed between the layers.

It is postulated that the peptizing effect is caused by the emulsion destablization. When a paint particle is destabilized the components of the paint separate out at different rates. First the solvent and pigment molecules are dislodged from the polymer molecule periphery. Then, the magnesium ions peptize the components of the paint particle and penetrate the helix which further displaces solvent and pigment molecules that are absorbed by the silicate minerals.

As the helix is drawn further into the interlayer space it is peptized by the other magnesium ions at the interlayer. Along with the polymer helix, paint and solvent are drawn into the interlayer and further detackified.

The polymer helix is an elongate carbon chain having two ends. According to one theory of the present invention a silicate mineral particle adheres to each end of the elongate polymer helix to encapsulate the sticky polymer between layers of the clay as described above.

According to the present invention a combination of complex silicate minerals and other inerts may be matched to the paint or combination of paints used in paint spraybooths to achieve an effective initial kill.

If exposed to solvents used to clean spray booth equipment, the addition of paint denaturant of the present invention will effectively detackify the residue. When prior paint denaturants are added to detackify residue which is made tacky as a result of such solvents they are relatively ineffective due to the inability of the paint denaturant to penerate the residue. The peptizing effect of the magnesium sulfate disperses the residue and permits effective detackification.

The composition of the paint denaturants of the present invention may be altered to encourage the formation of a residue best suited to a particular paint spraybooth's filtration or mechanical collection system.

Broadly the present invention is to provide a paint denaturant composition consisting essentially of a mixture of at least one complex silicate material and magnesium sulfate. The complex silicate mineral used in the invention is preferably bentonite and most preferably a combination of complex silicate minerals comprising a mixture of more than one complex silicate material selected from the group consisting of bentonite, kaolinite, or diatomite and magnesium sulfate.

A preferred slurried paint denaturant composition may comprise from five to twenty-five percent bentonite clay, zero to twenty-five percent kaolin clay, zero to twenty-five percent diatomite, 0.3 to ten percent magnesium sulfate, and seventy to ninety-three percent water. A preferred powdered form paint denaturant composition made according to the present invention consists essentially of forty to fifty parts by weight of bentonite, fifteen to twenty-five parts by weight of kaolinite, zero to thirty-five parts by weight of diatomite and from 0.3 to five parts by weight of magnesium sulfate. A most preferred slurried form of the present invention nominally comprises about ten parts by weight bentonite, ten parts by weight kaolinite, 0.3 parts by weight magnesium sulfate and eighty parts by weight of water. As disclosed herein diatomite may be substituted for kaolinite. For example, the slurry may contain 5% by weight diatomite and 5% by weight kaolinite. The term nominally as used herein shall mean within ten percent of a given mixture when referring to complex silicate minerals and within five percent of a given mixture when referring to magnesium sulfate.

The present invention also relates to a composition for use as an additive to a circulating water system of a paint spray booth including a paint denaturant composition made according to the present invention. The additive of the present invention nominally comprises in a preferred embodiment an aqueous solution of four percent of a forty percent active polyacrylate, which is a polyelectrolyte. Another preferred additive composition nominally comprises four percent by weight of forty percent active polyacrylate and thirty-one percent magnesium sulfate in water resulting in about 2% of the polyacrylated in the slurry. The term nominally as used in reference to a polyacrylate shall mean within five percent of a given mixture.

Based upon extensive experimentation with considerable number of possible compositions, applicant has isolated those which have satisfactory characteristics for the denaturation of solvent based paints with the field of the industrial applications. It appears that magnesium sulfate when combined with silicate materials increases the effectiveness of the silicate materials at denaturing solvent based paints.

DETAILED DESCRIPTION OF THE INVENTION

According to the present invention, it has now been shown that denaturation compositions for solvent based paints are constituted by aqueous solutions containing complex silicate minerals and magnesium sulfate.

Slurried pain denaturant concentrate solutions according to the invention contain from 0.3 to 10% by weight of magnesium sulfate, 0.3 to 60% by weight of bentonite clay, 0 to 50% by weight of kaolinite, 0 to 50% by weight of diatomite and 70 to 93% by weight water. More preferably, the slurried paint denaturant comprises by weight 70 to 93% water, 0.3 to 10% magnesium sulfate and at least 5% complex silicate mineral materials as a fine powder suspended in the water; said silicate materials consisting essentially of at least 40% bentonite and at least 15% of an additional silicate mineral selected from the group consisting of kaolinite and diatomite. Unless otherwise specified, all quantities specified herein by percent shall be understood to be percent by weight.

Non-slurried paint denaturant compositions according to the invention comprise from 1 to 25 parts by weight of magnesium sulfate, from 40 to 50 parts by weight of bentonite, from about 1 to 50 parts by weight of kaolinite, and from about 0 to 35 parts by weight of diatomite.

The kaolinite is preferably of the non-swelling type, however, it is also possible to use the swelling type. The preferred type of bentonite is sodium bentonite, but calcium bentonite has also been used satisfactorily and it is anticipated that any type of bentonite could be used in the composition of the present invention.

Other particulate materials known to be used in paint denaturants such as talc, mica, trilite clay, and others can be used as additions in the compositions of the present invention to aid in detackifying specific components of a particular paint.

EXAMPLE I

One example of the slurried form of the present invention is prepared by combining 80 parts by weight of water with 0.8 parts by weight of magnesium sulfate which is permitted to dissolve in the water for 15 minutes. Then, approximately 9.6 parts by weight of powdered kaolinite, is added to the aqueous magnesium sulfate solution and mixed for 30 minutes. Next, approximately 9.6 parts by weight of powdered bentonite is added and mixed for 60 minutes. The resultant composition has a smooth consistency.

The compound is used by adding the slurry to the water recirculating system of a paint spray booth at the rate of from 0.5% to 10% volume to volume of slurry to the water in the paint recirculating system.

EXAMPLE II

In another slurried paint denaturant composition of the present invention 0.8 parts by weight of magnesium sulfate is dissolved in 80 parts by weight of water. When dissolved, the complex silicate minerals in powder form are added slowly in the following amounts: 4.3 parts by weight of kaolinite; 4.3 parts by weight of diatomite; and 9.6 parts by weight of bentonite. The solution is mixed thoroughly and continuously as the silicate minerals and diatomite are added to form a slurry having a smooth consistency. The slurry is then ready to be added to the water recirculating system of a paint spray booth as described above.

EXAMPLE III

Another version of the slurried paint denaturant of the present invention is prepared by first dissolving 1 part by weight of magnesium sulfate in 79 parts per weight of water. Then, 14 parts by weight of powdered bentonite clay and 6 parts by weight of diatomite type are added and mixed thoroughly. The resultant slurry has a smooth consistency and is added to the water recirculating system of the paint spray booth as described above.

EXAMPLE IV

An exemplary dry form paint denaturant may have the following composition: 40 to 50 parts by weight of bentonite, 15 to 50 parts by weight of kaolin clay, 0 to 35 parts by weight of diatomite, and 0.3 to 5 parts by weight of magnesium sulfate.

While use of the dry form of the present invention is not preferred due to problems associated with colloidal silicate materials in a paint spray booth where dust can adversely affect the quality of the paint, such compositions would perform as paint denaturants according to the present invention.

EXAMPLE V

Another exemplary dry paint denaturant composition may be prepared by combining 4 parts by weight of magnesium sulfate with 48 parts by weight of bentonite and 48 parts by weight of kaolinite.

EXAMPLE VI

Another exemplary dry paint denaturant composition may be prepared by combining as above 48 parts by weight of bentonite clay, 18 parts by weight of kaolinite, 33 parts by weight of diatomite and 4 parts by weight of magnesium sulfate.

The above described exemplary dry compositions should be added to the water recirculating system of paint spray booth in the amount of from 0.1 oz. to 2.0 oz. by weight of the paint denaturant composition per gallon of water in the water recirculating system.

The composition of an additive made according to the present invention may broadly contain from about 0.5 to 10 parts by weight of magnesium sulfate, 0 to 90% parts by weight of a polyelectrolyte composition, preferably of the 40% active polyacrylic acid type, and about 50 to 75 parts by weight of water.

Magnesium sulfate can also be added to the water recirculating system of a paint spray booth having a silicate based paint denaturant as an additive to improve the effectiveness of the paint denaturant. The magnesium sulfate may be added in powdered form or as an aqueous solution to improve the detackification of solvent based paints by peptizing the complex silicate minerals in the water recirculating system.

EXAMPLE VII

A preferred additive having the following nominal composition is prepared by mixing thoroughly 67 parts by weight water with 0.5 parts by weight polyelectrolyte type of the polyacrylic acid to which is added 32.5 parts by weight of magnesium sulfate.

The additive may be used with any of the slurry composition examples given above by adding the additive to the tank of the water recirculating system as needed to aid in dispersion of the paint overspray and paint denaturant. The quantity of additive used will vary considerably however a preferred range of the quantity added is typically between 0.1 to 10% volume to volume relative to the quantity of the aqueous solution contained in the water recirculating system.

In some instances, depending upon the engineering details of a paint spray booth and its water recirculating system including the type of filter used and the presence or absence of suitable de-watering apparatus, it may be adventageous to use a polyelectrolyte solution in combination with the paint denaturants described above. The cationic polyelectrolyte may nominally be a 4% aqueous solution of the 40% active polyacrylic acid type previously described. The polyelectrolyte may be advantageously metered into the water recirculating system adjacent the filter which removes the flocculation residue to further agglomerate the flocculation residue immediately prior to the filter, thereby assisting the filter in removing the residue. Increasing the degree of flocculation compensates for inadequacies in the paint spray booth system for de-watering the sludge by reducing the quantity of water removed with the sludge by the filter.

The following tests of concentrated slurried paint denaturants and additives were performed using a test tank having a total volume of 12 liters. The volume of paint denaturant slurry added to the tank was 180 milliliters. The volume of additive solutions A or B added to the tank was 60 milliliters. The balance of the tank was filled with water.

The following concentrated compositions were tested for kill effectiveness and dispersion with five different types of solvent based paint. The types of paint tested are proprietary formulations identified by the following tradenames of the corresponding manufacturers:

| Tradename | (Abbreviation) | Manufacturer |
|---|---|---|
| Rigid Clear Coat | (CC) | PPG Industries Inc. |
| Ford PPV Commerical Enamel | (HSE) | Ford Motor Co. |
| Taupe | | Glasurit |
| Metallic Base Coat | (BC) | Inmont Corp. |
| 703 Prime | (703) | PPG Industries Inc. |

Additive solutions A and B have the following compositions by weight percents:

| Constituent | Solution A | Solution B |
|---|---|---|
| 40% Active Polyacrylate | 4% | 4% |
| MgSO$_4$ | | 31% |
| H$_2$O | 96% | 65% |

| Denaturant Slurry Tested | | |
|---|---|---|
| | Control #1 | Slurry #1 |
| Bentonite | 10% | 9.6% |
| Kaolinite | 10% | 9.6% |
| MgSO$_4$ | | 0.8% |
| H$_2$O | 80% | 80% |

| | Test Results | | | |
|---|---|---|---|---|
| Paint | Kill | Dispersion | Kill | Dispersion |
| CC | excellent | poor | excellent | excellent |
| HSE | excellent | poor | excellent | excellent |
| Taupe | excellent | poor | excellent | poor |
| BC | excellent | poor | excellent | excellent |
| 703 | excellent | poor | excellent | excellent |

| Denaturant Slurry Tested | | |
|---|---|---|
| | Slurry #1 | Slurry #1 |
| Bentonite | 9.6% | 9.6% |
| Kaolinite | 9.6% | 9.6% |
| MgSO$_4$ | 0.8% | 0.8% |
| H$_2$O | 80% | 80% |
| Additive | | |
| A | yes | |
| B | | yes |

| | Test Results | | | |
|---|---|---|---|---|
| Paint | Kill | Dispersion | Kill | Dispersion |
| CC | excellent | poor | excellent | excellent |
| HSE | excellent | excellent | excellent | excellent |
| Taupe | excellent | poor | excellent | poor |
| BC | excellent | excellent | excellent | excellent |
| 703 | excellent | excellent | excellent | excellent |

| Test Results Key | |
|---|---|
| Kill | Dispersion |
| Excellent-nontacky | Excellent-dispersed |
| Good-residual tackiness/smears | Good-moderately dispersed |
| Fair-tacky | Fair-semi-dispersed |
| Poor-extremely tacky | Poor-large agglomerations |

| Denaturant Slurry Tested | | |
|---|---|---|
| | Control #2 | Slurry #2 |
| Bentonite | 9.6% | 9.6% |
| Kaolinite | 4.92% | 4.92% |
| Celite | 4.92% | 4.92% |
| MgSO$_4$ | | 0.3% |
| H$_2$O | 80% | 80% |

| | Test Results | | | |
|---|---|---|---|---|
| Paint | Kill | Dispersion | Kill | Dispersion |
| CC | good | poor | excellent | excellent |
| HSE | excellent | poor | excellent | excellent |
| Taupe | good | poor | excellent | poor |
| BC | excellent | poor | excellent | excellent |
| 703 | excellent | excellent | excellent | excellent |

| Denaturant Slurry Tested | | |
|---|---|---|
| | Slurry #2 | Slurry #2 |
| Bentonite | 9.6% | 9.6% |
| Kaolinite | 4.92% | 4.92% |
| Celite | 4.92% | 4.92% |
| MgSO$_4$ | 0.3% | 0.3% |
| H$_2$O | | |
| Additive | | |
| A | yes | |
| B | | yes |

| | Test Results | | | |
|---|---|---|---|---|
| Paint | Kill | Dispersion | Kill | Dispersion |
| CC | excellent | excellent | excellent | excellent |
| HSE | excellent | excellent | excellent | excellent |
| Taupe | excellent | excellent | excellent | excellent |
| BC | excellent | excellent | excellent | excellent |
| 703 | excellent | excellent | excellent | excellent |

| Denaturant Slurry Tested | | |
|---|---|---|
| | Control #3 | Slurry #3 |
| Bentonite | 10% | 9.6% |
| Celite | 10% | 9.6% |
| MgSO$_4$ | | 0.8% |
| H$_2$O | 80% | 80% |

| | Test Results | | | |
|---|---|---|---|---|
| Paint | Kill | Dispersion | Kill | Dispersion |
| CC | good | poor | excellent | excellent |
| HSE | excellent | poor | excellent | excellent |
| Taupe | good | poor | excellent | poor |
| BC | excellent | excellent | excellent | excellent |
| 703 | excellent | poor | excellent | excellent |

| Denaturant Slurry Tested | | |
|---|---|---|
| | Slurry #3 | Slurry #3 |
| Bentonite | 9.6% | 9.6% |
| Celite | 9.6% | 9.6% |
| MgSO$_4$ | 0.8% | 9.8% |
| H$_2$O | 80% | 80% |
| Additive | | |
| A | yes | |
| B | | Yes |

| | Test Results | | | |
|---|---|---|---|---|
| Paint | Kill | Dispersion | Kill | Dispersion |
| CC | excellent | excellent | excellent | excellent |
| HSE | excellent | excellent | excellent | excellent |
| Taupe | excellent | poor | excellent | excellent |
| BC | excellent | excellent | excellent | excellent |
| 703 | excellent | excellent | excellent | excellent |

Denaturant Slurry Tested

-continued

|  | Control #4 | Control #4 |
|---|---|---|
| Bentonite | 13.0% | 12.2% |
| Kaolinite | 5.0% | 4.9% |
| Celite | 9.0% | 8.9% |
| MgSO4 |  | 1.1% |
| H2O | 73.0% | 73.0% |

Test Results

| Paint | Kill | Dispersion | Kill | Dispersion |
|---|---|---|---|---|
| CC | excellent | poor | excellent | excellent |
| HSE | excellent | excellent | excellent | excellent |
| Taupe | excellent | poor | excellent | excellent |
| BC | excellent | poor | excellent | excellent |
| 703 | excellent | excellent | excellent | excellent |

Denaturant Slurry Tested

|  | Slurry #4 | Slurry #4 |
|---|---|---|
| Bentonite | 12.2% | 12.2% |
| Kaolinite | 4.9% | 4.9% |
| Celite | 8.9% | 8.9% |
| MgSO4 | 1.1% | 1.1% |
| H2O | 73.0% | 73.0% |
| Additive |  |  |
| A | yes |  |
| B |  | yes |

Test Results

| Paint | Kill | Dispersion | Kill | Dispersion |
|---|---|---|---|---|
| CC | excellent | excellent | excellent | excellent |
| HSE | excellent | excellent | excellent | excellent |
| Taupe | excellent | excellent | excellent | excellent |
| BC | excellent | excellent | excellent | excellent |
| 703 | excellent | excellent | excellent | excellent |

The following tests of powder form paint denaturants and additives were performed using a test tank having a total volume of 12 liters. The quantity by weight of powdered paint denaturant added was 130 grams. The volume of additive solution A or B added to the tank was 60 milliliters. The balance of the tank was filled with water.

The powdered compositions and additives were tested as described above.

Denaturant Powder Tested

|  | Control #5 | Composition #5 |
|---|---|---|
| Bentonite | 50% | 48% |
| Celite | 50% | 48% |
| MgSO4 |  | 4% |

Test Results

| Paint | Kill | Dispersion | Kill | Dispersion |
|---|---|---|---|---|
| CC | poor | poor | excellent | excellent |
| HSE | excellent | poor | excellent | excellent |
| Taupe | excellent | poor | excellent | poor |
| BC | excellent | poor | excellent | excellent |
| 703 | excellent | poor | excellent | excellent |

Denaturant Powder Tested

|  | Composition #5 | Composition #5 |
|---|---|---|
| Bentonite | 48% | 48% |
| Celite | 48% | 48% |
| MgSO4 | 4% | 4% |
| Additive |  |  |
| A | yes |  |
| B |  | yes |

Test Results

| Paint | Kill | Dispersion | Kill | Dispersion |
|---|---|---|---|---|
| CC | excellent | excellent | excellent | excellent |
| HSE | excellent | poor | excellent | excellent |
| Taupe | excellent | excellent | excellent | excellent |
| BC | excellent | excellent | excellent | excellent |
| 703 |  |  |  |  |

Denaturant Powder Tested

|  | Control #6 | Composition #6 |
|---|---|---|
| Bentonite | 50% | 48% |
| Kaolinite | 50% | 48% |
| MgSO4 |  | 4% |

Test Results

| Paint | Kill | Dispersion | Kill | Dispersion |
|---|---|---|---|---|
| CC | fair/good | poor | good | excellent |
| HSE | poor | poor | excellent | excellent |
| Taupe | poor | poor | good/fair | excellent |
| BC | fair | poor | not tested | not tested |
| 703 | not tested | not tested | not tested | not tested |

Denaturant Powder Tested

|  | Composition #6 | Composition #6 |
|---|---|---|
| Bentonite | 48% | 48% |
| Kaolinite | 48% | 48% |
| MgSO4 | 4% | 4% |
| Additive |  |  |
| A | yes |  |
| B |  | yes |

Test Results

| Paint | Kill | Dispersion | Kill | Dispersion |
|---|---|---|---|---|
| CC | good | fair | good | fair |
| HSE | good | good | good | good |
| Taupe | fair | good | good | good |
| BC | excellent | excellent | excellent | excellent |
| 703 | not tested | not tested | not tested | not tested |

SUMMARY OF TEST RESULTS

A comparison of the test results of Control #1 and Slurry #1 indicates that for all paints except for Taupe, the dispersion improved from poor with Control #1 to excellent with or without additives A or B. The kill for both the Control #1 and Slurry #1 in all cases was excellent.

A comparison of the test results for Control #2 and Slurry #2 indicates that paints CC, HSE, and BC the dispersion improved from poor to excellent with or without additives A or B. Dispersion with Taupe improved from poor to excellent when additive A or B was used and that dispersion and kill in all instances was excellent for paint 703. Kill improved for CC and Taupe from good with the control to excellent in all other cases.

A comparison of the test results of Control #3 and Slurry #3 dispersion improved from poor to excellent for CC, HSE, and 703 in all cases. The test results for Taupe improved from poor to excellent when Slurry #3 was supplemented with additive B. In all instances dispersion and kill was excellent for BC. Kill improved from good to excellent with or without additive A or B in the tests of CC and Taupe.

A comparison of the test results of Control #4 and Slurry #4 indicates that dispersion for CC, Taupe, and BC improved from poor to excellent with or without additive A or B. Kill achieved was exceellent in both the control and all tests of Slurry #4.

A comparison of the test results of the powdered form paint denaturants Control #5 and Composition #5 indicates that the kill for CC improved from poor to excellent with or without additives A or B and that dispersion improved for all paints but Taupe from poor to excellent with or without additive A or B and improved from poor to excellent for Taupe with additive B.

A comparison of the tests results of Control #6 and Composition #6 indicates that kill improved from fair/good to good with CC paint in all instances, from poor to excellent for HSE without additive A or B and only to good with additive A or B, from poor to good/fair for Taupe without either additive and to good with additive A or B, and kill improved from fair to excellent with additives A or B. Paint 703 was not tested. Dispersion achieved with the control for all paints tested improved from poor to excellent with all three paints tested without additive A or B. With additive A or B dispersion improved from poor to fair with CC paint, from poor to good with HSE and Taupe, and from poor to excellent with BC.

In general, the paint denaturant compositions of the present invention are useful with a wide variety of paints and are generally effective in denaturing paint overspray and creating a non-tacky sludge.

It will be appreciated that the versatile paint denaturant composition of the present invention may be changed to suit a particular paint spray booth recirculating system its sludge removal apparatus by varying the percent composition of the paint denaturant constituents.

Thus it is apparent that there has been provided a full and complete description of several embodiments of a paint denaturant composition in accordance with the present invention, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A slurried paint denaturant composition for denaturing and detackifying paint overspray particles upon addition to circulating water system of a paint spray booth, said paint denaturant composition comprising by weight 70 to 93% water, 0.3 to 10% magnesium sulfate, and at least 5% complex silicate mineral materials as a fine powder suspended in water; said silicate materials consisting essentially of 40 to 50 parts by weight bentonite and 15 to 25 parts by weight kaolinite, and up to 35 parts by weight diatomite, provided that the diatomite component is present in an amount sufficient to constitute at least 4.9% by weight of the final slurried composition.

2. The slurried paint denaturant composition defined in claim 1, characterized in that said composition further includes polyelectrolyte which increases the dispersion of colloidal solutions and increases flocculation present in an amount sufficient to increase flocculation.

3. The slurried paint denaturant composition defined in claim 1, characterized in that said composition includes 15 to 50% by weight kaolinite based on the composition of the additional silicate material.

4. The slurried paint denaturant composition defined in claim 1, characterized in that said composition includes about equal parts by weight of kaolinite and diatomite.

5. A paint denaturant composition which comprises about 48 parts by weight bentonite, 18 parts by weight kaolinite, 33 parts by weight diatomite and 4 parts by weight magnesium sulfate.

* * * * *